Jan. 27, 1970 P. W. WAGENER ET AL 3,492,508

TIMER DEVICE USING A VARIABLE SWEEP GENERATOR WITH TEMPERATURE COMPENSATION

Filed Nov. 15, 1966

WITNESSES

Theodore F. Wrobel

Irwin A. Shaw

INVENTORS
Paul W. Wagener and
Frank Di Nicolantonio

BY W. Brodahl

ATTORNEY 3,492,508
TIMER DEVICE USING A VARIABLE SWEEP GENERATOR WITH TEMPERATURE COMPENSATION

Paul W. Wagener, Lancaster, and Frank Di Nicolantonio, Williamsville, N.Y., assignors to Westinghouse Electric Corporation, Pittsburgh, Pa., a corporation of Pennsylvania Filed Nov. 15, 1966, Ser. No. 594,547
Int. Cl. H03k *17/28*
U.S. Cl. 307—293 2 Claims

ABSTRACT OF THE DISCLOSURE

This invention comprises a timer device having a delay period with a predetermined proportional relationship to a voltage input. A switching circuit is utilized in both the output and an input trigger circuit for initiating the delay period. Multiple input terminals are provided which permit a wide range of voltage signal magnitudes without adding an external voltage divider. Temperature compensation is provided to enable operation of the timer device within the temperature range of —20° C. to 65° C. without variation in the provided delay period of more than 5% assuming the voltage input remains substantially constant.

Figure 1:
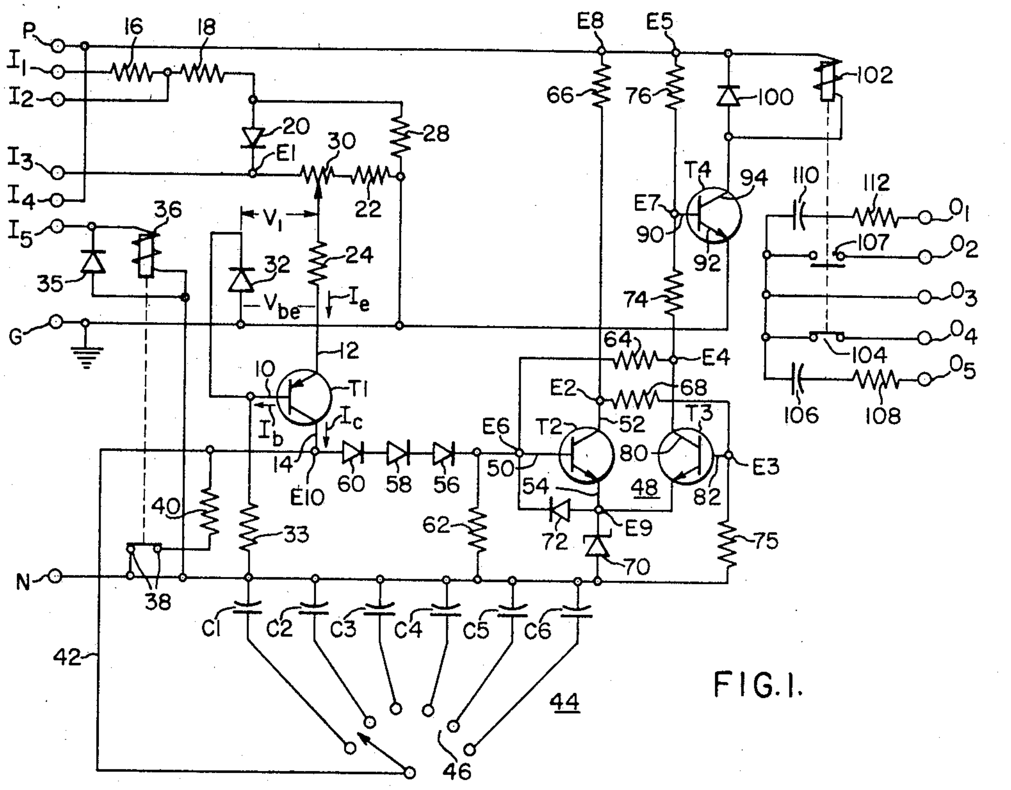

This invention relates to time delay circuits, and more particularly to transistor timers having a time delay inversely proportional to a voltage input.

It has been known in the prior art to utilize time delay circuits having a resistance-capacitance circuit connected across a direct current supply as the main timing element, the voltage across the capacitor being the timing parameter. Many of these devices have been found to be quite temperature sensitive due to the high temperature dependence of the semiconductor characteristics, such as the base-emitter voltage drops, gain and leakage currents of the transistors and the voltage drops and leakage currents of the diodes. Thus consistent and repeated operation over a wide temperature range has been difficult. In addition, where a wide range of input voltages are possible, it has often been necessary to provide an external voltage divider network for large input voltages.

It is, therefore, an object of this invention to provide an improved time delay circuit having reliable operating characteristics over a wide range of ambient temperatures.

Another object of this invention is to provide an improved time delay circuit having a time delay inversely proportional to a voltage input.

A further object of this invention is to provide a time delay circuit adaptable to a wide range of input voltages.

Still another object of this invention is to provide a time delay circuit substantially independent from variances of transistor gain with temperature, and having rapid switching capability achieved through the use of positive feedback.

In accordance with one embodiment of the invention, a relay actuated trigger permits an input voltage signal to be modified to charge a timing capacitor with a constant current circuit. When a sufficient charge builds up on the capacitor, a normally non-conducting device breaks down allowing a first normally non-conducting transistor switch to conduct. This transistor switch controls a normally non-conducting relay energizing transistor which operates to pickup an output relay and provide a first of two stable output states. The conducting of the relay energizing transistor is hastened through a regenerative or positive feedback on the first transistor switch resulting in a so-called "snap action" of the output relay to thereby provide a substantially instant response. The delayed action of the apparatus is the result of the finite and regulatable time required to charge the timing capacitor to a predetermined potential. To a great extent the delay time is a function of capacitor size and input voltage but finer regulation is likewise available by altering the current magnitude used for charging the timing capacitor.

When the input trigger relay is opened, the first previously conducting transistor switch moves toward nonconduction. Meanwhile, a second transistor switch is actuated and lowers the base voltage of the previously conducting relay energizing transistor switch to place it in a non-conducting state while simultaneously reinforcing by positive feedback the first transistor switch to a greater non-conducting state. The output relay is dropped out and the second of the bistable output states is realized.

Figures 2, 3:
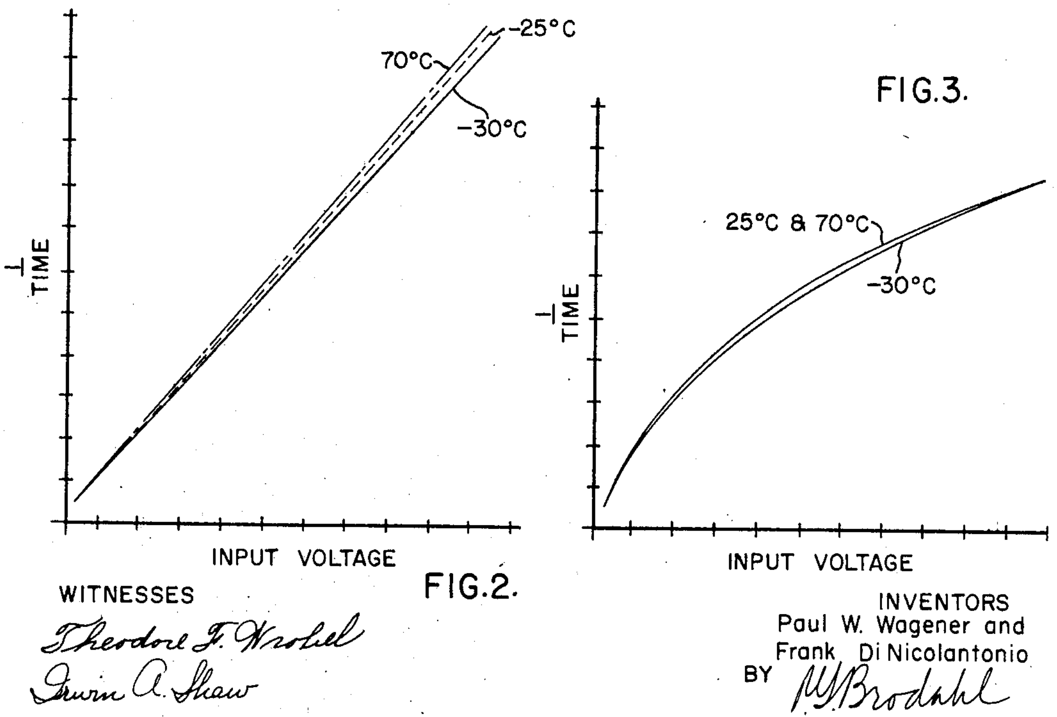

Other objects and features of the invention will become apparent upon consideration of the following description thereof when taken in conjunction with the accompanying drawings, in which:

FIGURE 1 is a schematic illustration of one embodiment of the invention illustrating the delay timer with relay contact switching in both the trigger input and the output; and FIGS. 2 and 3 illustrate operating characteristics for predetermined desired delay periods over a temperature range.

Referring now to FIG. 1, transistor T1 is of the PNP type and has a base 10, an emitter 12 and a collector 14. Input signals are supplied to transistor T1 through one of the input terminals I1, I2, or I3. Input terminal I1 is used for the higher voltage inputs and is supplied to transistor T1 through resistors 16 and 18, diode 20, potentiometer 30 and resistor 24. For input signals having a maximum strength of approximately ½ that used terminal I1, terminal I2 is used with the input signal being fed through the same path as that with terminal I1 except that resistor 16 is bypassed. This is done in an attempt to make the voltage strength at terminal E1 substantially constant such that the regulation achieved by varying potentiometer 22 will have a like effect regardless of the input voltage strength. With the bypassing of resistor 16 through terminal I2, an input voltage drop that would otherwise occur across resistor 16 is eliminated. Resistor 28 forms a voltage divider with the input resistors 16 and 18 when voltage input terminal 11 or I2 are used. This also serves to maintain the more constant voltage desired at terminal E1 as the setting of the potentiometer 22 is varied. Terminal I3 is used for input signals having a maximum strength of approximately half that a terminal I2. Diode 20 is used to maintain a sufficiently large input resistance when terminal I3 is used. Resistor 28 is unnecessary when input terminal I3 is used and, if diode 20 were not otherwise present, it would decrease the input resistance. Input terminals I1 and I2 should not be used for voltage inputs that would otherwise be suitable for terminal 13 as the forward voltage drop of diode 20 is subtracted from the voltage input and would contribute a significant error with a small voltage input signal. Input terminal I4 is shown connected directly to a positive voltage source P, as a necessary supply for operation of numerous other elements within the apparatus. Inasmuch as the positive voltage source P is within the input range of input terminal I3, input terminal I4 is provided merely as a convenience for making a direct connection between input terminals I3 and I4 for preset time delay applications.

A base reference signal for transistor T1 is supplied from the input signal through potentiometer 30, resistor 22 and diode 32. The emitter 12 is connected through resistor 24 to the top of potentiometer 30. A modified output current proportional to the input voltage is achieved through the collector 14 and connected to terminal E10. Diode 32 is used to compensate for the emitter base voltage drop of transistor T1 and at the same time to help cancel out the variations of the emitter base voltage with temperature. Resistor 24 is used to improve the temperature stability of the transistor T1 and to make the adjustment of the potentiometer 22 more linear over its full range of adjustment. Resistor 33 provides a reference path below ground for the base current path of transistor T1.

An input trigger relay 36 is provided which has a conducting bar normally dropped out thus closing the circuit through the contacts at 38. Diode 35 is provided to protect the relay 36 from any reverse voltage and to dissipate stored energy of coil when the trigger signal at input terminal I5 is removed. With this contact closed the output signal from transistor T1 appearing at terminal E10 is directed through resistor 40 to the negative voltage source N. Upon energizing the input trigger relay 36, the conducting bar is picked up thereby opening the contacts 38. The input trigger relay 36 is activated at input terminal I5 upon the application of a positive input voltage. For convenience, triggering of this relay may be accomplished through a direct connection of input terminal I5 to input terminal I4.

Timing capacitors C1 through C6 are provided which are responsive to the output current through the collector 14 of transistor T1 when input trigger relay 36 is energized. To further improve the temperature characteristics of the timer and the linearity of the voltage rise on the timing capacitors, the capacitors chosen for the apparatus have extremely small leakage currents even at high temperatures. Since the delay of the timer is largely dependent upon the size of the capacitor chosen a manual switch 46 is provided for convenient alterations of the delay time as desired. The manual switch 46 connects the output signal of transistor T1 to the positive side of at least one of the capacitors C1 through C6.

An output switching stage 48 is provided through normally non-conducting transistor T2 and normally conducting transistor T3. Transistor T2 is of the NPN type and has a base 50, collector 52 and emitter 54. The base of transistor T2 is connected through diodes 56, 58 and 60 to the collector of transistor T1 at terminal E10. Also connected to the base 50 is a resistor 62 which is itself connected to a negative voltage source N. Feedback from transistor T3 is provided from the collector 80 of transistor T3 through resistor 64 to the base 50 of transistor T2. The collector 52 of transistor T2 is connected through resistor 66 to the positive power supply P and also through resistor 68 to the base 82 of transistor T3. The emitter 54 of transistor T2 is connected to the negative power supply through a Xener diode 70 such that there can be no conduction through the emitter until the difference between the base 50 of transistor T2 and the negative voltage supply N is sufficient to breakdown the Zener diode 70. A diode 72 is provided between the emitter 54 and base 50 of transistor T2 to prevent excessive emitter-base voltage (>5 volts) which would breakdown the emitter-base junction. The diodes 56, 58 and 60 are necessary to compensate for the voltage variations through the Zener diode 70 due to temperature changes.

Transistor T3 is of the NPN type and has a collector 80, base 82 and emitter 83. The collector 80, in addition to being connected to the base 50 of transistor T2 through resistor 64, is also connected to the base 90 of transistor T4 through resistor 74. The base 82 is connected through resistor 68 to the collector 52 of transistor T2 and also through resistor 75 to the negative voltage source N. Emitters 83 of transistor T3 and 54 of transistor T2 are connected to a common terminal E9.

An NPN transistor T4 is provided which is responsive to the conducting of transistor T2 to be placed itself in a conducting state. The base 90 of transistor T4 in addition to being connected to the collector 80 of transistor T3 through resistor 74 is also connected through resistor 76 to the positive voltage source P. The emitter 92 of transistor T4 is connected directly to the ground terminal G. Collector 94 of transistor T4 is connected through a diode 100 to the positive voltage source P and to one side of the output relay 102.

Output relay 102 is normally deenergized and the contact points 104 are closed to short common output terminal $O_3$ to output terminal $O_4$. A first output device would be normally connected to terminals $O_3$, $O_4$ and $O_5$. When the output relay 102 is energized, the contacts at 104 are opened and those at 107 are closed to complete a circuit and short common output terminal $O_3$ to output terminal $O_2$. A second output device would normally be connected to output terminals $O_1$, $O_2$ and $O_3$. The capacitor 110 and resistor 112 included before output terminal $O_1$ and capacitor 106 and resistor 108 included before output terminal $O_5$ are employed to control the rate of rise of voltage so as to regulate the rate of rise of voltage across respective contacts 107 and 108 to prevent arcing and ensure long contact life.

The operation of the apparatus may be described as follows: relay 36 is an input relay and is normally deenergized thus allowing the closure of the contacts 38. A constant input source is supplied to either of terminals I1, I2 or I3 depending upon the magnitude of the input signal. The voltage signal passes through terminal E1 and potentiometer 30 and is acted upon by a transistor T1 to give a constant output current $I_c$ at terminal E10. The input signal V1 through transistor T1 can be described by the following formula:

$$V_1=I_eR_{24} \tag{1}$$

$R_{24}$ equals the resistance of resistor 24 and $I_e$ equals the emitter current. $V_{be}$ equals the base-emitter voltage drop of transistor T1 which is cancelled by diode 32. The output current $I_c$ can be described by:

$$I_c=I_e-I_b \tag{2}$$

where $I_b$ and $I_c$ are the respective base and collector currents of transistor T1. Solving Formula 1 for $I_e$ and substituting for $I_e$ in Formula 2:

$$I_C=\frac{V_1}{R_{24}}-I_b \tag{3}$$

but for a constant input voltage $V_1$ and base current $I_b$ will be constant; therefore $I_c$ will remain constant except for changes in temperature. If $I_b$ is small compared to $I_c$ then:

$$I_c\cong\frac{V_1}{R_{24}}$$

Thus it is seen that the output current $I_c$ is directly proportional to the voltage signal $V_1$ and will remain constant. As long as the input relay 36 is deenergized the output current $I_c$ will be directed through resistor 40 to the negative voltage source N. On the other hand, when the input relay 36 is energized the contacts at 38 are open thus diverting the output signal $I_c$ to the positive side of a timing capacitor determined by switch 44. The charging capacitor will charge over a finite time until the voltage across it is equal to:

$$V_{CAP}=V_Z+V_{bez}+3V_{DF}$$

where $V_Z$ equals the Zener voltage of 70, $V_{bez}$ equals the emitter-base junction voltage of T2, and $V_{DF}$ equals the forward junction voltage of diodes 60, 58 and 56. The buildup of the voltage across the timing capacitor may be given by the formula:

$$V_{CAP}=\frac{1}{C}\int_0^x i_C dt$$

but, as has been previously mentioned the current $I_c$ is constant and thus:

$$V_{CAP}=\frac{I_c t}{C}$$

Solving for $t$, the time required to charge the timing capacitor would then be:

$$t=\frac{V_{CAP}C}{I_c}$$

Consequently the time required to charge the capacitor is inversely proportional to the charging current $I_c$. Once the Zener diode 70 breaks down transistor T2 begins to conduct. The collector voltage E2 of transistor T2 is lowered thereby lowering the potential at E3 or the base of transistor T3 to less than the potential at the emitter to put T3 in a non-conducting state. Now a voltage divider relationship exists between the positive voltage source P at E5 through resistors 76, 74, 64, and 62 to the negative voltage source N. The voltage divider relationship forces a rise in the voltage at terminal E4 which consequently acts to raise the voltage at terminal E6. In effect, the added potential from the voltage divider acts as positive feedback for the transistor T2 and gives a regenerative effect. Similarly, the voltage at E7, the base of transistor T4, is raised to permit transistor T4 to conduct and the output relay 102 to be energized. Henceforth, the output relay 102 will continue to be energized as long as the input relay trigger 36 is energized. However, when the input trigger relay 36 is deactuated the contacts at 38 are again closed thus discontinuing any output signal through the timing capacitor and instead directing it through resistor 40 to the negative voltage source N. As the voltage at point E6 lowers, transistor T2 becomes less conductive thereby raising the potential at E2 and E3, the base of transistor T3. As the voltage at E3 increases, the voltage at E4 is subsequently decreased as transistor T3 begins to conduct thereby causing the potential of E6 to decrease and force T2 to a non-conductive state. Meanwhile, a voltage divider relationship exists between terminal E8, resistors 66, 68 and 75 to the negative voltage source N which further raises the potential of E3 to cause the transistor T3 to conduct more fully. As the potential at E4 drops the base of transistor T4 also begins to drop to below ground potential thereby causing transistor T4 to become non-conductive and to drop out the relay 102.

FIG. 2 shows a curve of data taken using a 180 microfarad, 25 volt timing capacitor. The graph shows that the inverse of the time delay varies linearly with the voltage input. The variation of the time delay with temperature is also shown. Assuming all conditions remain the same, the length of the time delay will not vary more than plus or minus 2% with repeated operations. Doubling the input voltage will halve the time delay, within an accuracy of plus or minus 2%, except when a time delay becomes less than 0.1 second. The relay switching times, which are approximately 1.5 milliseconds, become significant with time delays less than 0.1 second and do not vary with the input voltage. Thus, the relay switching times therefore contribute an error which becomes more significant as the time delay becomes shorter.

FIG. 3 shows the variation of the inverse of time delay with the voltage input where time delays of less than 100 milliseconds are involved. The non-linearity of the graph is due to the switching time of the relays as previously explained.

Typical values of the circuit components are listed below. These values are intended to be exemplary of an operating embodiment of the invention and are not to be interpreted in a limiting sense, since other values may be substituted to achieve satisfactory operation.

| | | |
|---|---|---|
| Transistor T1 | | 2N1614 |
| Transistor T2 | | 2N2192 |
| Transistor T3 | | 2N2192 |
| Transistor T4 | | 2N1613 |
| Zener diode **70** | volts | 15 |
| Resistors **16**, **33** | ohms | 10K |
| Resistor **18** | do | 4.64K |
| Resistor **24** | ohms±1% | 14.7K |
| Resistor **28** | ohms | 5.62K |
| Resistor **30** | do | 1.00K |
| Resistor **40** | do | 14.7 |
| Resistors **62**, **64** | do | 825K |
| Resistor **66** | do | 46.4K |
| Resistor **74** | do | 5.62K |
| Resistor **75** | do | 261K |
| Resistor **76** | do | 31.6K |
| Resistors **108**, **112** | do | 178 |
| Diode **20** | | 1N914 |
| Diode **35** | | 1N914 |
| Diode **56** | | 1N914 |
| Diode **58** | | 1N914 |
| Diode **60** | | 1N914 |
| Diode **72** | | 1N914 |
| Diode **100** | | 1N914 |
| Capacitor C1 | μf | 180 |
| Capacitor C2 | μf | 68 |
| Capacitor C3 | μf | 15 |
| Capacitor C4 | μf | 3.3 |
| Capacitor C5 | μf | .68 |
| Capacitors C6, **110**, **106** | μf | .22 |
| Potential source P | volts | +24 |
| Potential source N | do | −24 |
| $I_1$—suggested input range | do | 100–200 |
| $I_2$—suggested input range | do | 50–100 |
| $I_3$—input range | do | 0–50 |

Below is a table illustrating operating conditions for various delay requirements.

| Timing capacitor (mfd.) | Suggested range at time delays (sec.) | Reset time (sec.) |
|---|---|---|
| 0.22 | .004–.04 | .00005 |
| 0.68 | .01–.15 | .0001 |
| 3.3 | .04–.7 | .0005 |
| 15 | .2–3.5 | .002 |
| 68 | .7–15 | .01 |
| 180 | 2–40 | .02 |

The invention is not to be restricted to these specific structural details or circuit connections herein set forth, as various modifications thereof may be effected without departing from the spirit and scope of this invention.

We claim:

1. In a timer device having a controlled delay period for the provision of an output signal, the combination of:
   - signal input means having a plurality of input terminals, with each of said input terminals being responsive to input signals of a different predetermined intensity range for providing a first control signal,
   - first switching means responsive to said input signals for changing states to initiate said delay period,
   - a constant current source responsive to said first control signal for providing a constant current proportional to said first control signal when said delay period is initiated,
   - second switching means including a first device, temperature compensating means for providing a substantially constant delay over a predetermined range of temperatures operatively connected between said constant current source and said first device and a threshold device,
   - timing capacitor means operatively connected to said threshold device and said current source to receive said constant current and being charged thereby for said delay period according to the capacitance value thereof, said delay period being terminated when the threshold of said threshold device is reached, and
   - bistable output means responsive to the termination of said delay period for changing output states and remaining in that state until said first switching means reverts to its original state.

2. The combination of claim 1 wherein:

said timing capacitor means includes a plurality of timing capacitors having different capacitance values, respectively, and means for selectively connecting individual ones of said plurality of timing capacitors to said current source for selecting said delay period in accordance with the capacitance value of the selected timing capacitor.

References Cited

UNITED STATES PATENTS

| | | | |
|---|---|---|---|
| 3,113,250 | 12/1963 | Wood | 307—293 |
| 3,114,114 | 12/1963 | Atherton et al. | 328—185 |
| 3,125,686 | 3/1964 | Vitt et al. | 307—293 |
| 3,297,883 | 1/1967 | Schulmeyer et al. | 307—269 |
| 3,309,625 | 3/1967 | Lothrop | 328—185 |
| 3,310,688 | 3/1967 | Ditrofsky | 307—235 |
| 3,327,140 | 6/1967 | Rockey | 307—235 |
| 3,374,439 | 3/1968 | Hickey | 328—183 |

OTHER REFERENCES

Millman & Taub, Pulse, Digital, and Switching Waveforms, 1965, pp. 189, 528–531.

JOHN S. HEYMAN, Primary Examiner

J. D. FREN, Asssitant Examiner

U.S. Cl. X.R.

307—235, 269, 294, 310; 328—183, 184, 185